Feb. 4, 1958 — B. BAKER — 2,821,798
ROLL STRIP ROAD MAP HOLDER
Filed July 20, 1956
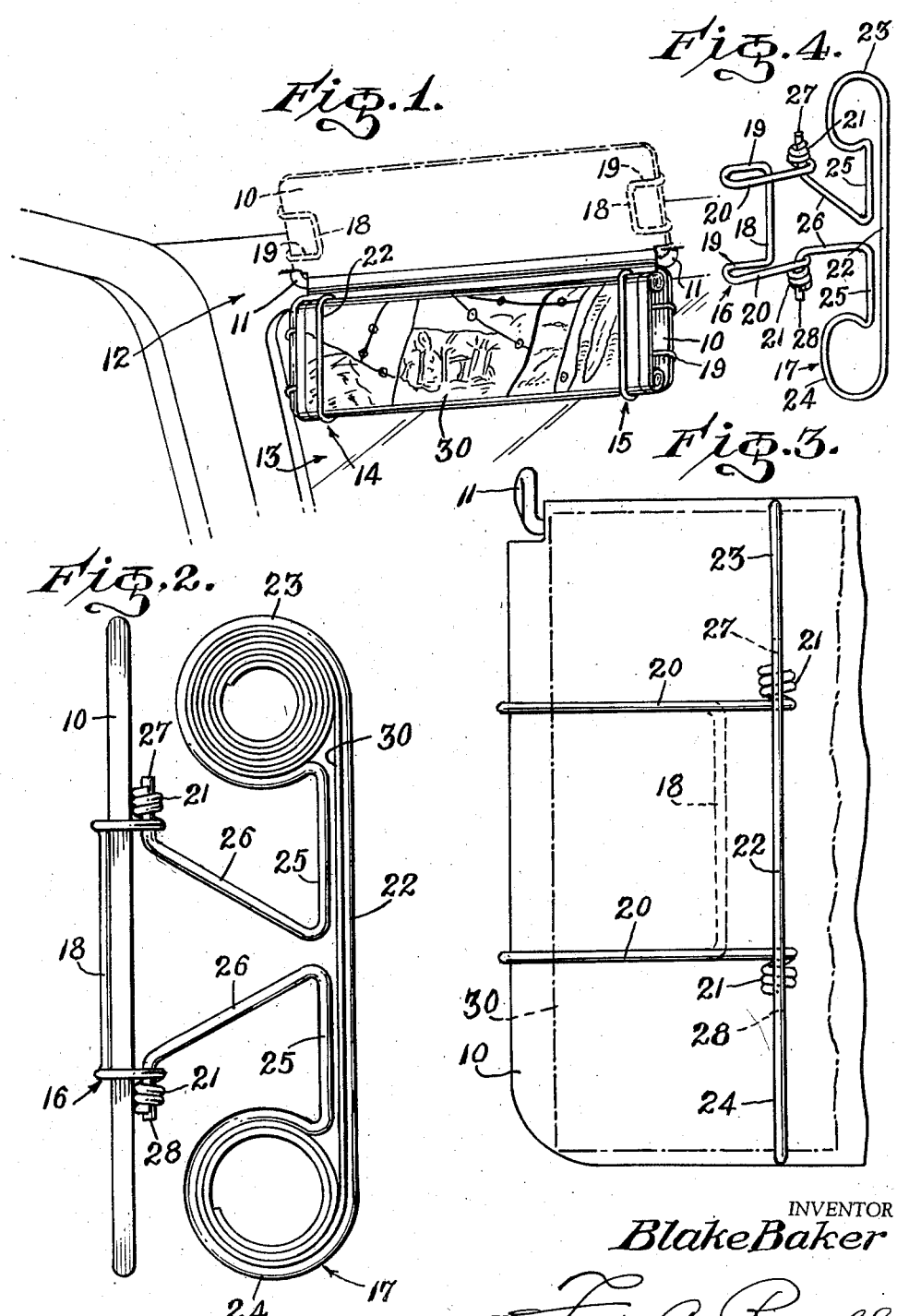
INVENTOR
*Blake Baker*
BY *Felix A. Russell*
ATTORNEY

United States Patent Office 2,821,798
Patented Feb. 4, 1958

2,821,798

ROLL STRIP ROAD MAP HOLDER

Blake Baker, St. Petersburg, Fla.

Application July 20, 1956, Serial No. 599,068

1 Claim. (Cl. 40—86)

The present invention relates to a roll strip road map holder and its consists in the combinations, constructions and arrangements of parts herein described and claimed.

Generally there is provided a device of the character set forth which comprises a pair of duplicate members each of which consists of a clamp formed of wire and adapted to be mounted upon one end of a conventional automobile sun visor. The clamp is formed of wire and has integrally formed therewith a pair of coils which act as hinge members. A pair of brackets is also provided and each is formed of a single piece of wire the ends of which form pintles for the hinge members. The brackets are formed with a pair of circular openings each adapted to receive one end of a rolled strip map. The device is such that any conventional map may be rolled and mounted therein and, when attached to a sun visor as aforesaid, may be brought into view only when needed and returned to a position adjacent the roof of the automobile when not in use, exactly in the manner of the sun visor without such attachment.

It is accordingly an object of the invention to provide a device of the character set forth which may be entirely formed of wire.

Another object of the invention is to provide a device of the character set forth which is simple in construction, inexpensive to manufacture and yet effective and efficient in use.

A further object of the invention is to provide a novel map holder which may be quickly and easily attached to or detached from a conventional sun visor for automobiles.

Still a further object of the invention is to provide, in a device of the character set forth, a novel hinge construction.

A further object of the invention is to provide, in a device of the character set forth, a novel clamp forming a part of the invention.

A still further object of the invention is to provide, in a device of the character set forth, a novel bracket forming a part of the invention.

Other and further objects of the invention will become apparent from a reading of the following specification taken in conjunction with the drawing, in which:

Figure 1 is a perspective view of an embodiment of the invention showing the same in use with a conventional sun visor for automobiles.

Figure 2 is an enlarged side elevational view of the device as illustrated in Figure 1, Figure 3 is a fragmentary front elevational view of the device shown in Figure 2, and Figure 4 is a perspective view of one duplicate portion of the invention.

Referring more particularly to the drawing, there is shown therein a conventional sun visor 10 provided with conventional hinge 11 and mounted upon the frame 12 of an automobile immediately above its windshield 13.

Since the present device consists of a pair of components generally indicated at 14 and 15, which components are exact duplicates of each other, only one of the components will be described herein.

Each component comprises a clamp member generally indicated at 16 and a bracket member generally indicated at 17.

The clamp member 16 is generally U-shaped and consists of a vertical bight portion 18 and horizontal legs 19 the outer portions 20 of which are bent in a reverse direction and terminate in vertically extending coils 21.

The bracket member 17 consists of a single piece of wire forming a vertical outer arm 22 each end of which is bent rearwardly to form a substantially circular upper roll-gripping portion 23 and a like lower roll-gripping portion 24. The portions 23 and 24 are integrally connected with relatively short vertical arms 25 which extend toward each other and terminate in outwardly divergent arms 26 which respectively terminate in an integrally formed upwardly extending pintle 27 and a downwardly extending pintle 28, the pintles 27 and 28 being received in the coils 21.

In operation, it will be apparent that the two components 14 and 15 may be attached to each end of the sun visor 10, it being apparent that the sun visor 10 may be inserted between the bight portion 18 and the reverse extensions 20 of the clamp 16 to thereby securely mount each clamp upon the sun visor 10. The brackets 17 may then be mounted upon the clamps 16 by inserting the pintles 27 and 28 into the coils 21, it being apparent that the entire device is formed of spring wire and that by bringing the arms 26 together, the insertion of the pintles is facilitated and that the brackets will be maintained in position by the normal outward bias of the arms 26. With the device thus mounted upon the sun visor 10, a strip map 30, which may be designed to fit the present device or which may be cut from a conventional map, may then be rolled and inserted into the bumper holders 23, it being apparent that the brackets 17 may be swung upon their hinged connections with the clamps 16 so that they may be moved toward or away from each other in order to facilitate the insertion of the roller map 30. The free edge of the thusly rolled map 30 may then be brought downwardly between the arms 25 and the arm 22 and inserted into the lower holders 24. It will be understood that the map 30 may first be tightly rolled before its insertion into the brackets 17 and thereafter allowed to expand normally so that the map 30 will be securely held in position. In order to move the web of the map downwardly in the brackets 17, it is only necessary to insert the fingers into the lower rolled portion of the map and to turn the same thus bringing the web downwardly from the original rolled portion to the portion contained in the lower members 24. Moistening the fingers prior to this operation will facilitate the moving of the map in this manner. It will also be apparent that the map 30 is now essentially a part of and will move with the sun visor 10 and may be moved upwardly in an out-of-the-way position as shown in dotted lines in Figure 1 or, when it is desired to consult the map 30, the same may be moved to its operative position as shown in Figure 1 by merely manipulating the sun visor 10 in the ordinary manner.

While but one form of the invention has been shown and described herein, it will be readily apparent to those skilled in the art that many minor modifications may be made without departing from the spirit of the invention or the scope of the appended claim.

What is claimed is:

A device of the character described comprising, in combination with a rectangular sun visor, a roll strip map holder consisting of a pair of components, each of said components comprising a U-shaped clamp having reversely bent legs, a coil formed integrally with the free end of each leg, a map-holding bracket having a vertical bar, an upper and a lower roll-gripping portion formed integrally with said bar, a pair of outwardly divergent arms each formed integrally with one of said gripping portions, and a pintle formed integrally with the free end of each arm, said pintles each pivotally engageable in one of said coils.

References Cited in the file of this patent

UNITED STATES PATENTS

| | | |
|---|---|---|
| 1,930,307 | Croes | Oct. 10, 1933 |
| 1,966,019 | Mishey | July 10, 1934 |
| 2,120,726 | Baker | June 14, 1938 |